US011068621B2

(12) United States Patent
Li et al.

(10) Patent No.: US 11,068,621 B2
(45) Date of Patent: Jul. 20, 2021

(54) METHOD FOR PATCHING A SHEET BODY TO A TARGET BODY

(71) Applicant: Siemens Industry Software Inc., Plano, TX (US)

(72) Inventors: Wei Yu Li, Shanghai (CN); Hai Peng Mao, Shanghai (CN); Feng Yu, Irvine, CA (US)

(73) Assignee: SIEMENS INDUSTRY SOFTWARE INC., Plano, TX (US)

( * ) Notice: Subject to any disclaimer, the term of this patent is extended or adjusted under 35 U.S.C. 154(b) by 259 days.

(21) Appl. No.: 16/348,951

(22) PCT Filed: Nov. 14, 2016

(86) PCT No.: PCT/CN2016/105758
§ 371 (c)(1),
(2) Date: May 10, 2019

(87) PCT Pub. No.: WO2018/086125
PCT Pub. Date: May 17, 2018

(65) Prior Publication Data
US 2019/0278872 A1 Sep. 12, 2019

(51) Int. Cl.
*G06F 30/00* (2020.01)
*G06F 111/02* (2020.01)
*G06F 113/24* (2020.01)

(52) U.S. Cl.
CPC .......... *G06F 30/00* (2020.01); *G06F 2111/02* (2020.01); *G06F 2113/24* (2020.01)

(58) Field of Classification Search
None
See application file for complete search history.

(56) References Cited

U.S. PATENT DOCUMENTS

2002/0085004 A1 7/2002 Lim
2010/0231587 A1 9/2010 Mawby
(Continued)

FOREIGN PATENT DOCUMENTS

WO WO2010105132 A1 9/2010

OTHER PUBLICATIONS

European Search Report for European Application No. 16920951.7-1224 dated Jun. 2, 2020.
(Continued)

*Primary Examiner* — Craig C Dorais
(74) *Attorney, Agent, or Firm* — Lempia Summerfield Katz LLC

(57) ABSTRACT

In computer assisted design, a sheet body is patched to a target body, wherein the boundary edges of sheet body are partially coincident with the target body. All segments of the sheet body boundary that are coincident or non-coincident to the target body are detected; for a non-coincident segment with at least one end point which is in the interior of the target body but not on the sharp edge, the corresponding patch position on the target body is determined, and the segment or an extension is projected on the target body; for a non-coincident segment with both end points on sharp edges of the target body, the open region between the segment and the sharp edges is filled as extension of the faces of sharp edges; the coincident segments and the projected or extended non-coincident segments are combined to divide the target body into separate regions; and one of the regions is replaced by the sheet body.

15 Claims, 21 Drawing Sheets

(56) References Cited

U.S. PATENT DOCUMENTS

| | | |
|---|---|---|
| 2012/0098821 A1 | 4/2012 | Sheng |
| 2013/0293541 A1 | 11/2013 | Maisonneuve |
| 2014/0257759 A1* | 9/2014 | Sheng .................... G06F 30/00 703/1 |
| 2017/0058176 A1* | 3/2017 | Chou ....................... C09D 1/00 |
| 2017/0058429 A1* | 3/2017 | Chuang .................. C30B 11/00 |

OTHER PUBLICATIONS

Freitag, Stefan, and Karsten Opitz. "Enhancements in blending algorithms." Hewlett Packard Journal 46:5 (1995): 24-34.

PCT International Search Report and Written Opinion of International Searching Authority dated Jul. 10, 2017, corresponding to PCT International Application No. PCT/CN2016/105758.

\* cited by examiner

METHOD FOR PATCHING A SHEET BODY TO A TARGET BODY

RELATED CASE

The present patent document is a § 371 nationalization of PCT Application Serial Number PCT/CN2016/105758, filed Nov. 14, 2016, designating the United States, which is hereby incorporated by reference.

TECHNICAL FIELD

The present disclosure relates to the field of computer-aided design (CAD), and more particularly to a method for patching a sheet body to a target body in a CAD environment.

BACKGROUND OF THE DISCLOSURE

Patching a sheet body, which is a connected set of faces, to a target body is needed in many occasions in CAD modeling to trim off or to smoothen a region of the target body. Improved methods are desirable.

SUMMARY OF THE DISCLOSURE

Various disclosed embodiments include methods for patching a sheet body to a target body, wherein the boundary edges of sheet body are partially coincident with the target body. A method includes detecting all segments of the sheet body boundary that are coincident or non-coincident to the target body; for a non-coincident segment with at least one end point which is in the interior of the target body but not on the sharp edge, determining the corresponding patch position on the target body, and projecting the segment or an extension of the segment on the target body; for a non-coincident segment with both end points on sharp edges of the target body, filling the open region between the segment and the sharp edges as extension of the faces of sharp edges; combining the coincident segments and the projected or extended non-coincident segments to divide the target body into separate regions; and replacing one of the regions by the sheet body.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

FIGS. 1 through 12B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

Patching a sheet body, which is a connected set of faces, to a target body is needed in many occasions in CAD modeling to trim off or to smoothen a region of the target body. The operation is non-trivial when the sheet body has part of its boundary edges tangent to the target body.

It is not a problem for the case when all boundary segments of the sheet body are coincident with a target body or connect the boundary edges of the target body.

However, a large set of the sheet bodies are not well prepared so they do not meet the boundary conditions above. In particular, transition surfaces from a separate design step or a different tool often leave the end open from the middle of the target body. When a non-coincident boundary segment of the sheet body ends in the middle of the target body or on a sharp edge of the target body, it will make the patching much more difficult and results in more errors.

Disclosed embodiments describe a method for patching a sheet body to a target body.

Figure 1:
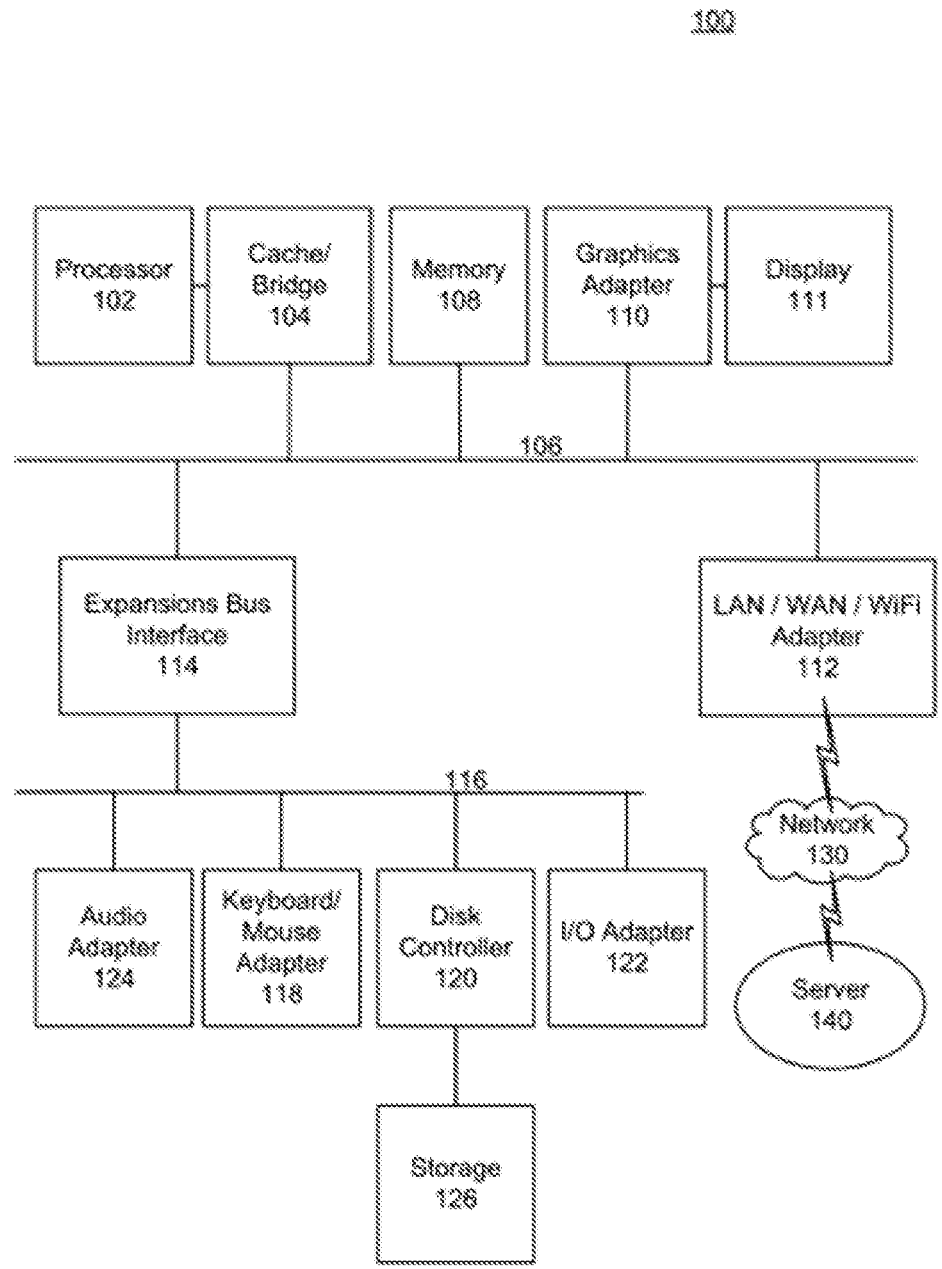
FIG. 1 illustrates a block diagram of a data processing system in which an embodiment can be implemented.

FIG. 1 illustrates a block diagram of a data processing system in which an embodiment can be implemented, for example as a computer-aided design system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or non-transitory machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, touchscreen, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash., may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

Figure 2:
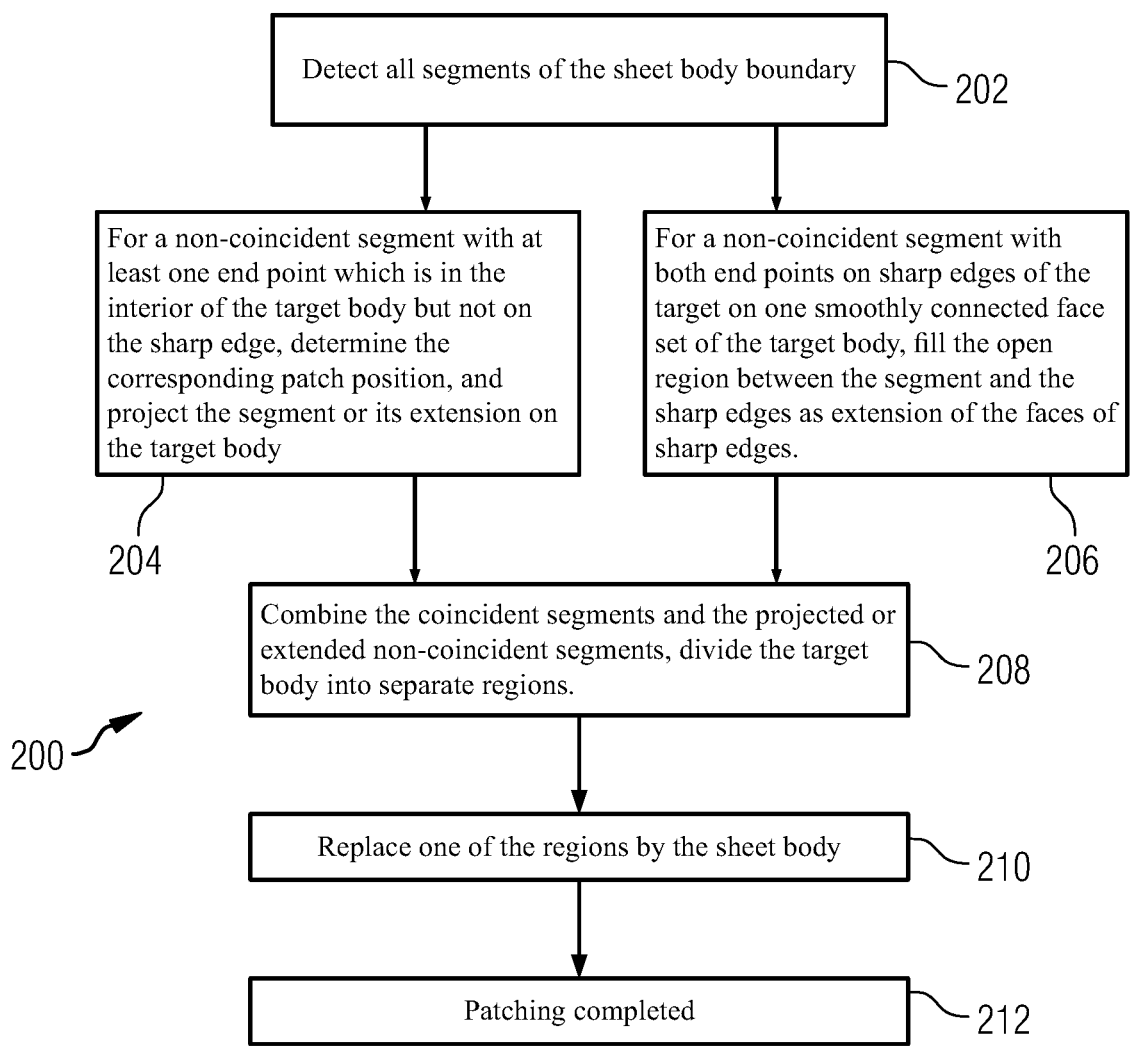
FIG. 2 illustrates a flowchart of a process for patching a sheet body to a target body in accordance with disclosed embodiments.

FIG. 2 is a process flowchart 200 illustrating an exemplary method of patching a sheet body to a target body in a CAD environment, according to one embodiment.

In step 202, the CAD system will detect all segments of the sheet body boundary that are coincident or non-coincident to the target body.

Figure 3:
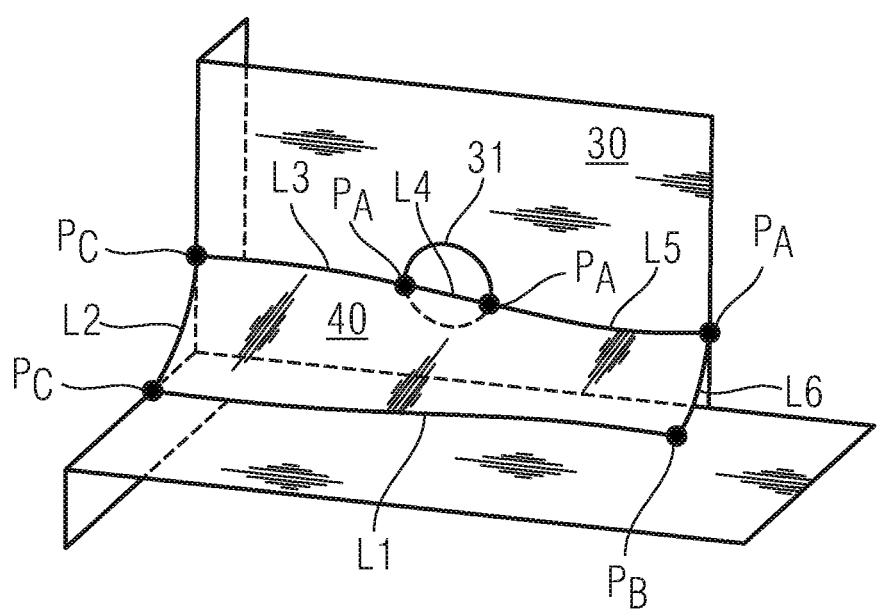
FIG. 3 illustrates different types of connecting points when patching a sheet body to a target body in accordance with disclosed embodiments.

FIG. 3 illustrates a case that a sheet body 40 to be patched with a target body 30 in accordance with one embodiment. There is a hole 31 on the target body 30.

The boundary of the sheet body 40 is split into segments L1, L2, L3, L4, L5 and L6. Segments L3, L5 and L1 are coincident to the target body 30, and segments L2, L4 and L6 are non-coincident to the target body 30.

The non-coincident segment connects end points of the adjacent coincident segments. It is assumed that there is at least one segment that is coincident to the target body. Each coincident segment is followed by a non-coincident segment and each non-coincident segment is followed by a coincident segment, for example, coincident segment L1 is followed by a non-coincident segment L6, and non-coincident segment L4 is followed by a coincident segment L3.

Then the end points of the boundary segments are categorized into the following types:

Point on the boundary of the target body, or call it as Type A point, for example, point $P_A$;

Point in the interior of the target body and not on a sharp edge of the target body, or call it as Type B point, for example, point $P_B$; and Point in the interior of the target body and on a sharp edge of the target body, or call it as Type C point, for example, point $P_C$.

For each non-coincident segment that connects two Type A points or connects a Type A point and a Type C point, no further action is needed. In FIG. 3, no action is needed for a non-coincident segment L4.

However, for other non-coincident segments, the CAD system will treat different non-coincident segments based on the types of the end points.

In step 204, for a non-coincident segment with at least one end point that is in the interior of the target body but not on the sharp edge, i.e., Type B point, the CAD system will determine the corresponding patch position on the target body, and project the segment or an extension of the segment or target body on the target body.

Three different non-coincident segments connect to at least one Type B point: non-coincident segment that connects a Type A point and a Type B point, non-coincident segment that connects a Type C point and a Type B point, and non-coincident segment that connects two Type B points. It will be discussed in details below.

Figure 4A:
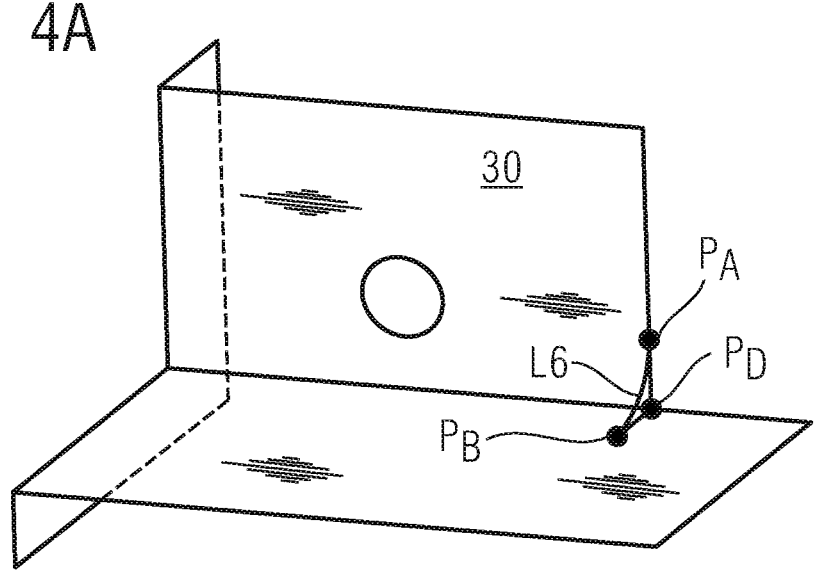
FIG. 4A illustrates an example of projecting a segment to the target body in accordance with disclosed embodiments.

For each non-coincident segment that connects a Type A point and a Type B point, the system will imprint new edges onto the target body. It could be done with different methods, for example:

FIG. 4A illustrates one method. In FIG. 4A, the system could define point $P_D$ as the next sharp corner point on the boundary of the target body 30 from the point $P_A$ towards the face of point $P_B$. Project the segment L6 onto the target face set that contains the point $P_B$ along the direction from the point $P_A$ to point $P_D$.

Figure 4B:
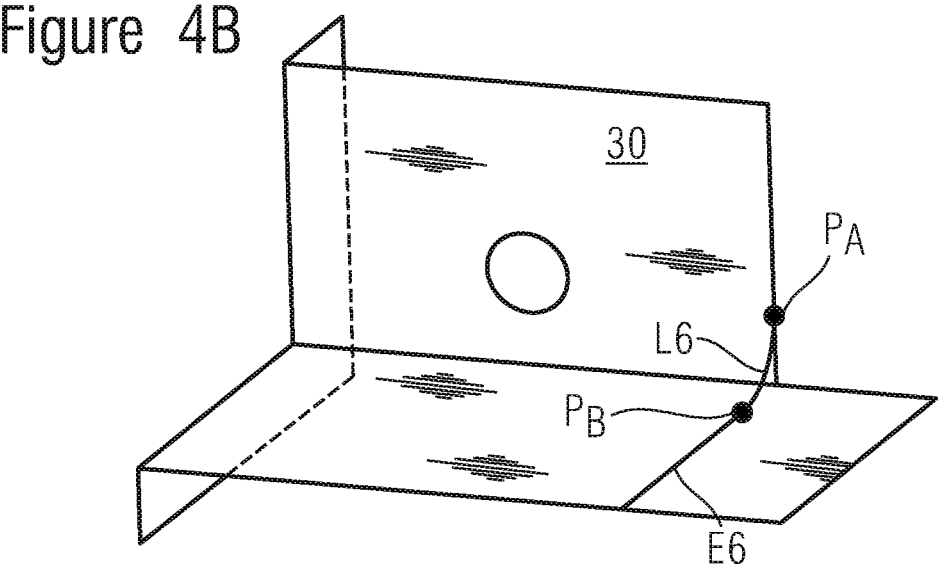
FIG. 4B illustrates another example of projecting a segment to the target body in accordance with disclosed embodiments.

Or,

FIG. 4B illustrates another method. In FIG. 4B, the system could project the smooth extension E6 of the segment L6 from point $P_B$ onto the target body 30 until the boundary or the next sharp edge of the target body 30.

Figure 4C:
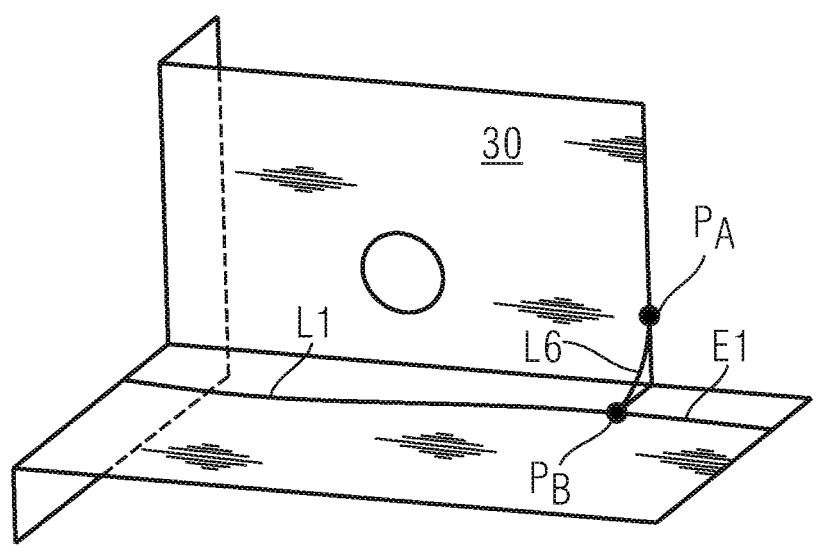
FIG. 4C illustrates a third example of projecting a segment to the target body in accordance with disclosed embodiments.

Or,

FIG. 4C illustrates another method. In FIG. 4C, the system could project the smooth extension E1 of the adjacent sheet body boundary segment L1 of point $P_B$ onto the target body 30 until the boundary or the next sharp edge of the target body 30.

Figure 5:
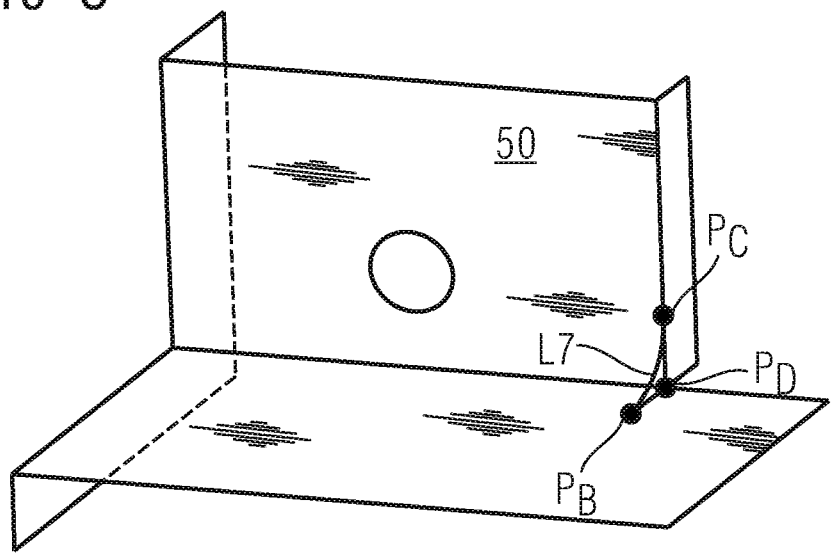
FIG. 5 illustrates an example of projecting a segment to the target body in accordance with disclosed embodiments.

For each non-coincident segment that connects a Type B point and a Type C point, imprint new edges onto the target body. It could be done with different methods, for example:

FIG. 5 illustrates one method. The system could define point $P_D$ as the next sharp corner point on the sharp edge from the point $P_C$ towards the face of point $P_B$. Project the segment L7 onto the target face set that contains the point $P_B$ along the direction from the point $P_C$ to point $P_D$ on the target body 50.

Or,

Project the smooth extension of the segment from Type B point onto the target body until the boundary or the next sharp edge of the target body.

Or,

Project the smooth extension of the adjacent sheet body boundary segment of Type B point onto the target body until the boundary or the next sharp edge of the target body.

For each non-coincident segment that connects two Type B points, imprint new edges onto the target body. It could be done with different methods, for example:

It could be done by projecting the segment onto the target face set that contains the Type B points along target face normal.

Or,

Project the smooth extensions of the segment from both Type B points onto the target body until the boundary or the next sharp edge of the target body.

Or,

Project the smooth extensions of the two adjacent tool boundary segments of the Type B points onto the target body until the boundary or the next sharp edge of the target body.

In step 206, for a non-coincident segment with both end points on sharp edges of the target, i.e., two Type C points on one smoothly connected face set of the target body, the system will fill the open region between the segment and the sharp edges as extension of the faces of sharp edges.

Figure 6:
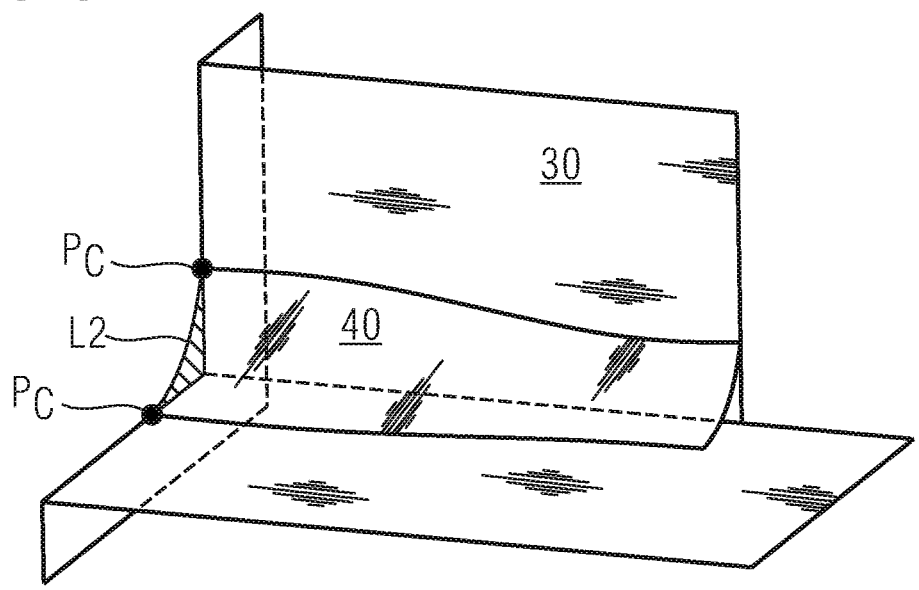
FIG. 6 illustrates how to handle a non-coincident segment with both end points on sharp edges of a target body in accordance with disclosed embodiments.

FIG. 6 illustrates the result. It will fill a surface to the region bounded by the segment L2 and the portion of boundary edges of the smoothly connected face set between the two points $P_C$. Then sew the surface to the sheet body 40 so that the sheet body 40 is extended to the new coincident boundary that replaces non-coincident boundary.

It is understood that it is not mandatory that step 204 should be conducted before step 206. It could be step 204 after step 206, or simultaneously.

Figure 7A:
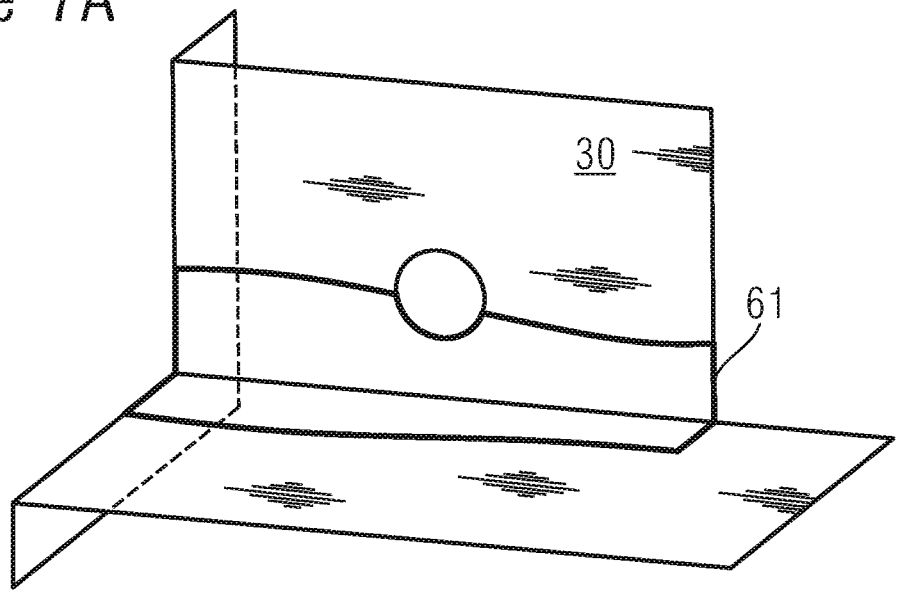
FIGS. 7A-7C illustrate different closed loops after the projection in accordance with disclosed embodiments.
Figure 7B:
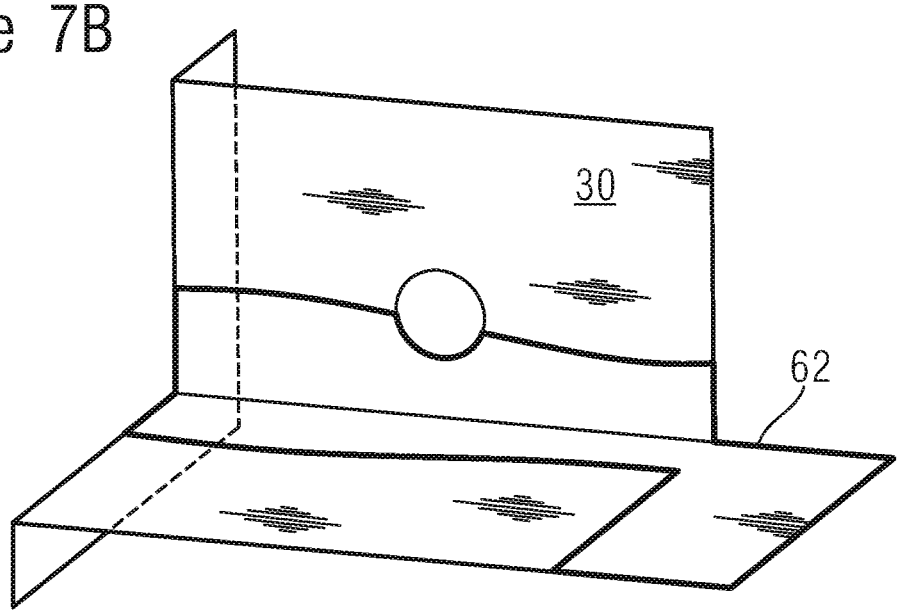
Figure 7C:
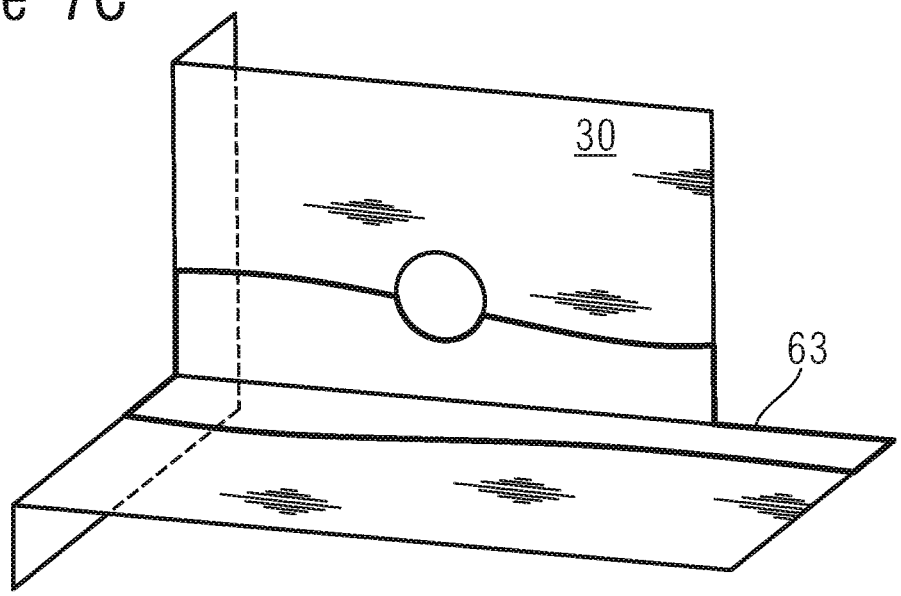

After steps above, it could form a closed loop on the target body by the imprinted coincident segments of sheet body boundary, the projected curves based on non-coincident segments of the sheet body boundary, and the relevant boundary edges and/or sharp edges of the target body. FIGS. 7A-7C illustrate the closed loops 61, 62 and 63 in bold lines.

In step 208, by combining the coincident segments and the projected or extended non-coincident segments, it is possible to divide the target body into separate regions. The system could remove the region inside or outside the loop and sew the sheet body to the remaining target body.

Figure 8A:
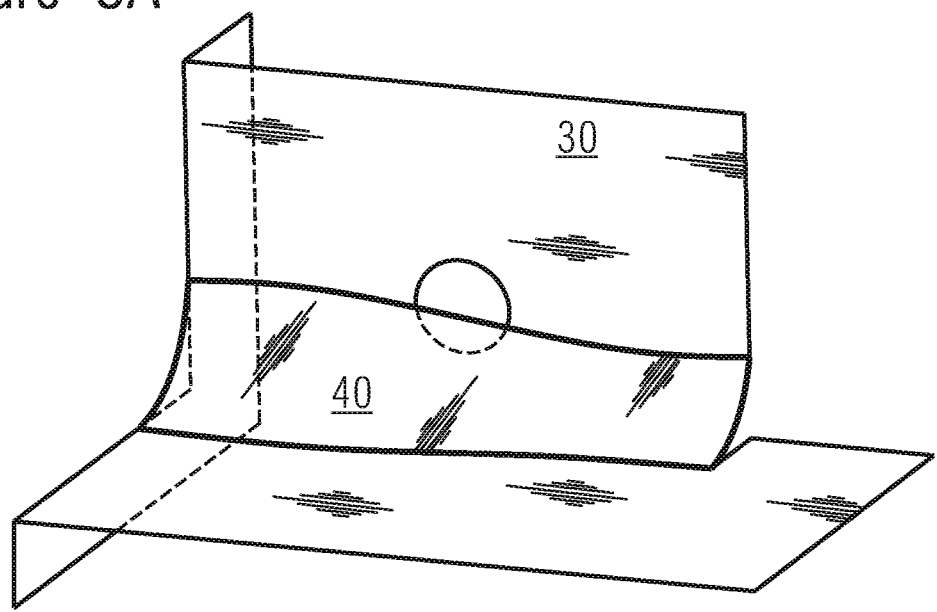
FIGS. 8A-8F illustrate different a patching result of a sheet body to a target body in accordance with disclosed embodiments.
Figure 8B:
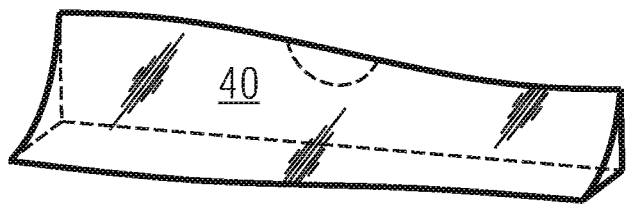
Figure 8C:
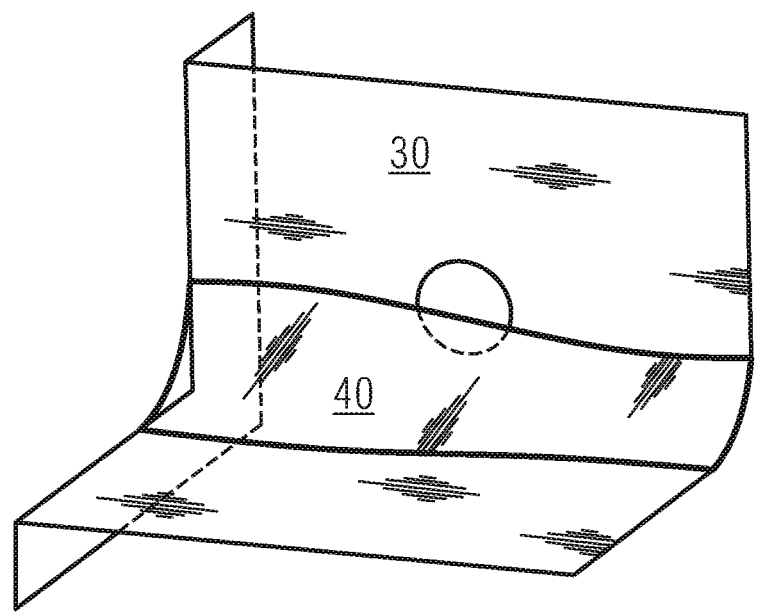
Figure 8D:
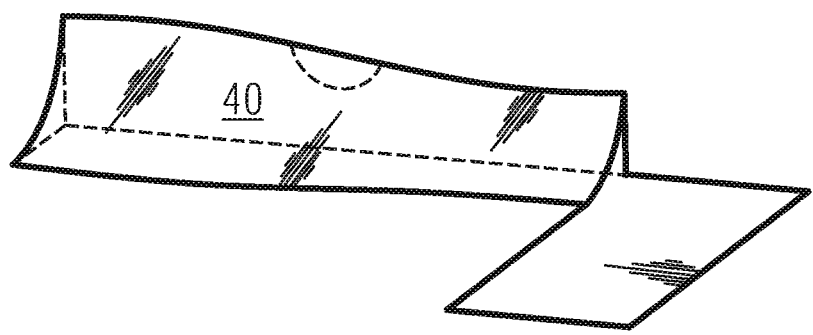
Figure 8E:
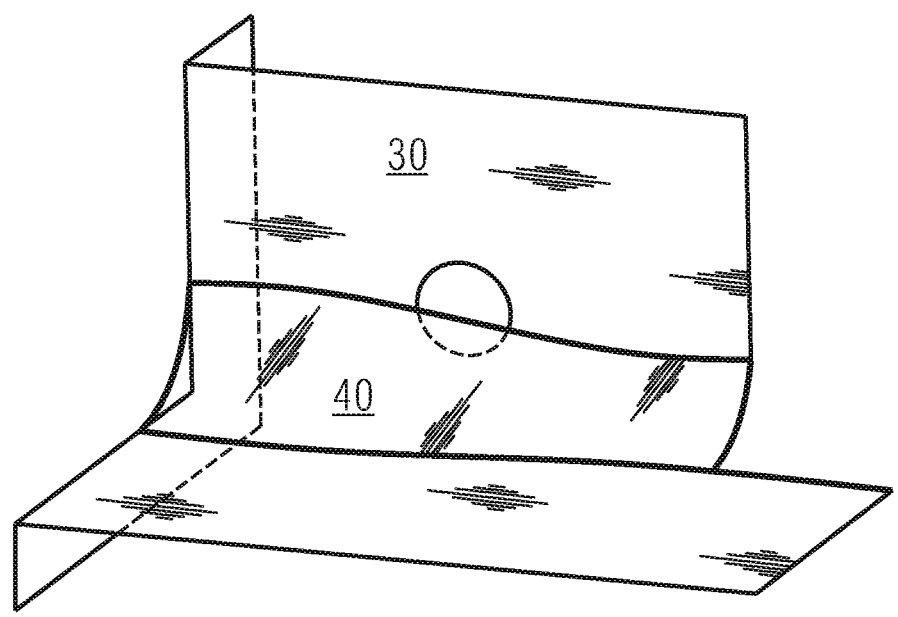
Figure 8F:
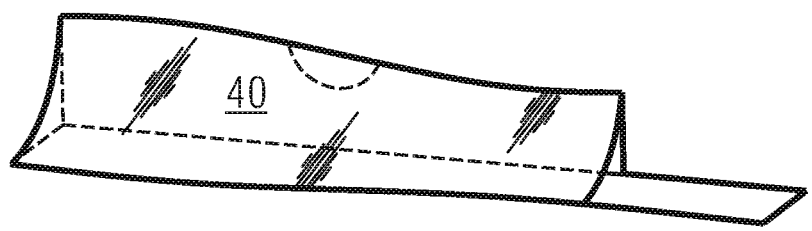

It is possible to:

trim short and remove the inside, as shown in FIG. 8A;

trim short and remove the outside, as shown in FIG. 8B;

trim along the non-coincident segment and remove the inside, as shown in FIG. 8C;

trim along the non-coincident segment and remove the outside, as shown in FIG. 8D;

trim along the adjacent coincident segment and remove the inside, as shown in FIG. 8E; or trim along the adjacent coincident segment and remove the outside, as shown in FIG. 8F.

Figure 9A:
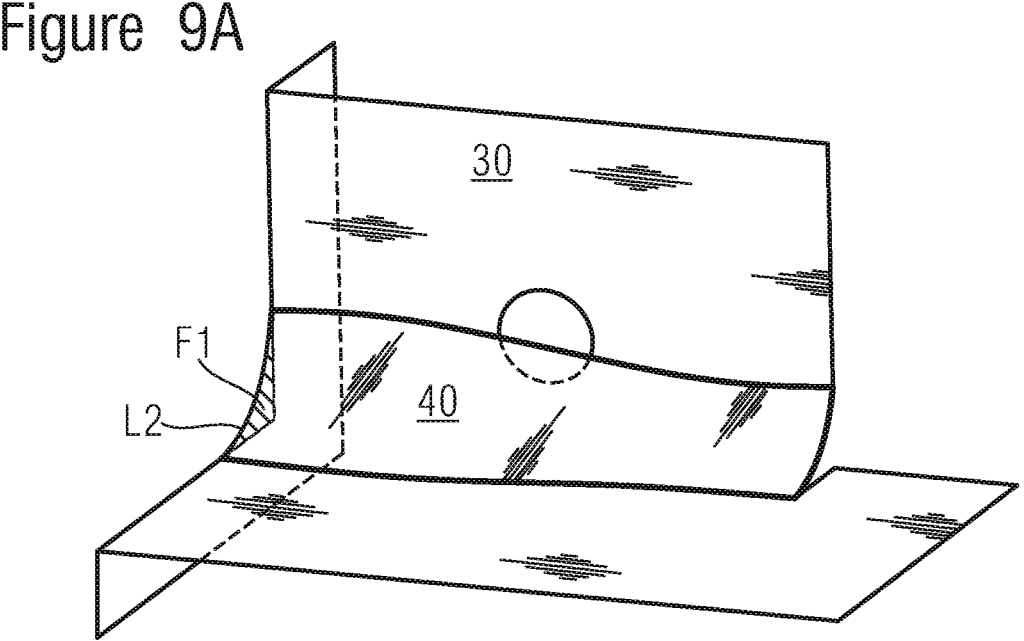
FIGS. 9A-9B illustrate the replacing of filled surface in accordance with disclosed embodiments.
Figure 9B:
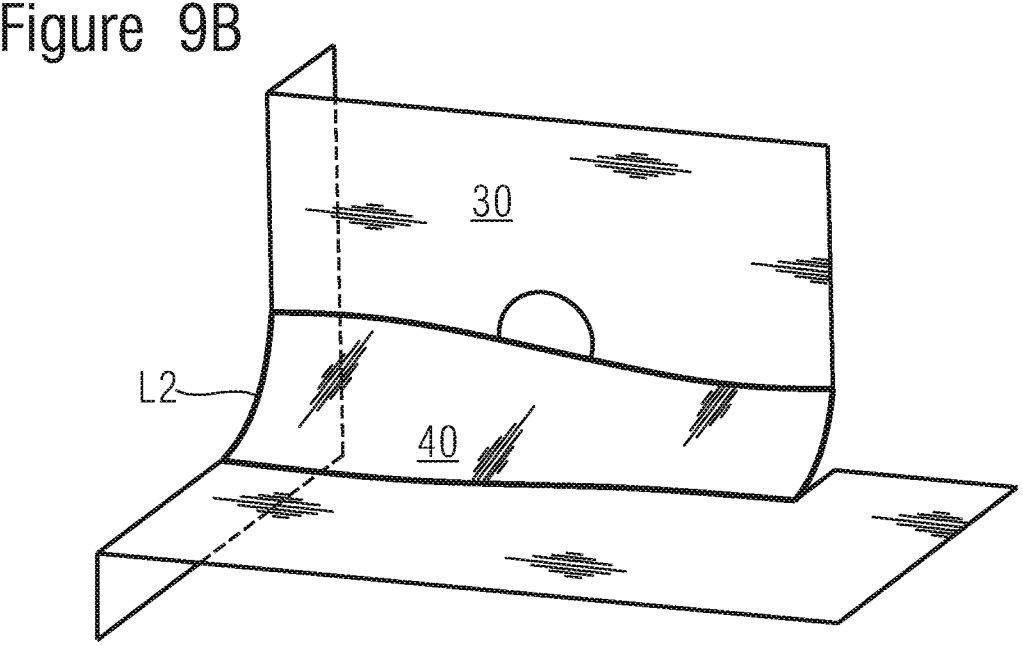

In step 210, for each filled surface in step 206, for example, in one exemplary embodiment as shown in FIG. 9A, the system could replace the filled surface F1 by extending the smoothly connected side face set of the target body 30, then the sheet body 40 may be trimmed or extended from the non-coincident segment L2 to the smoothly connected side face set, as illustrated in FIG. 9B.

In step 212, it completes the patching of the sheet body to the target body.

The different embodiments enable users to patch a sheet body of any shape to a target body as long as the sheet body boundary is partially coincident with the target body, even without any other prior information about the relation between the two bodies. The embodiments significantly improve the productivity, accuracy, and results for designers to integrate transition surfaces created in a separate design step or a different system, among providing numerous other benefits.

Of course, those of skill in the art will recognize that, unless specifically indicated or required by the sequence of operations, certain steps in the processes described above may be omitted, performed concurrently or sequentially, or performed in a different order.

For example, in one exemplary embodiment, patching of a sheet body to a target body is improved.

Figure 10:
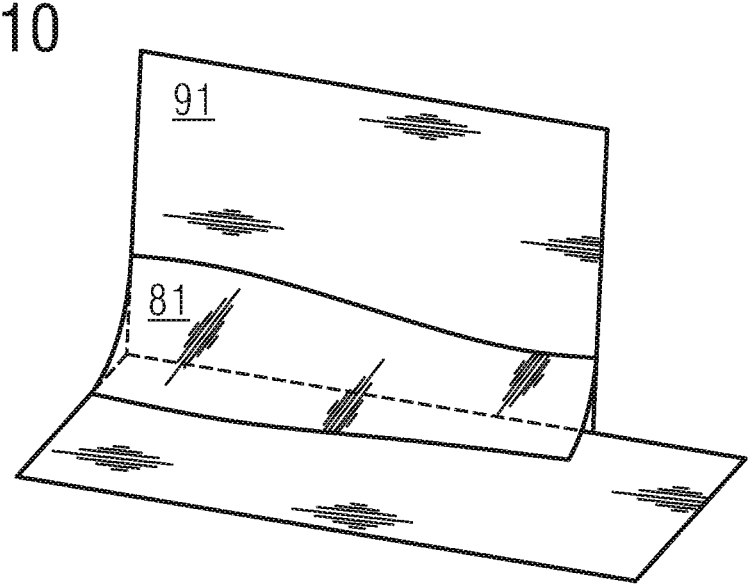
FIG. 10 illustrates an example of patching a sheet body to a target body in accordance with disclosed embodiments.
Figure 10A:
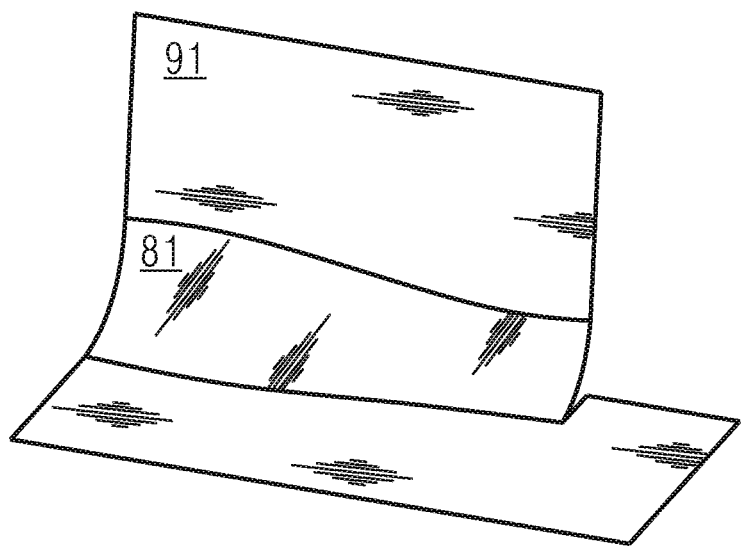
FIGS. 10A-10D illustrate the different patching result in accordance with disclosed embodiments.
Figure 10B:
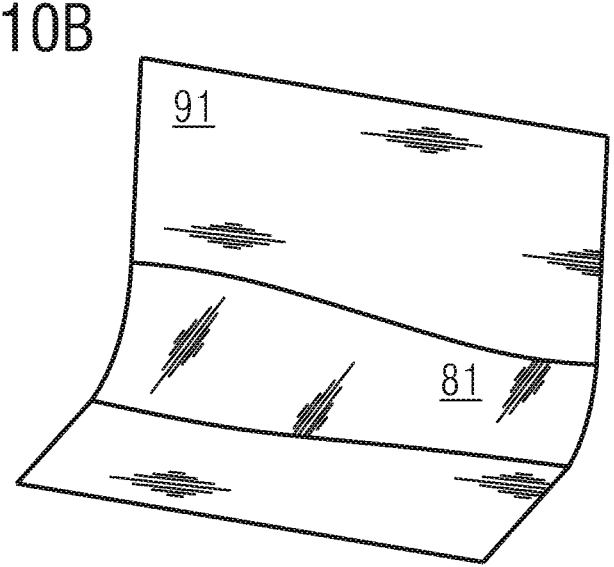
Figure 10C:
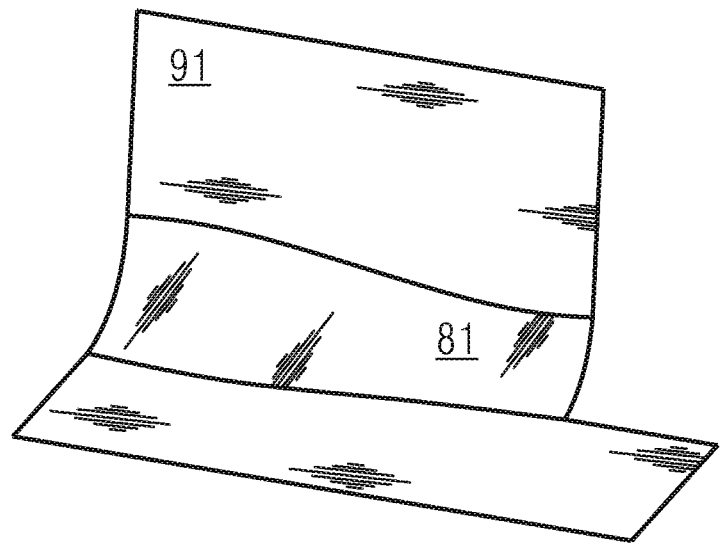
Figure 10D:
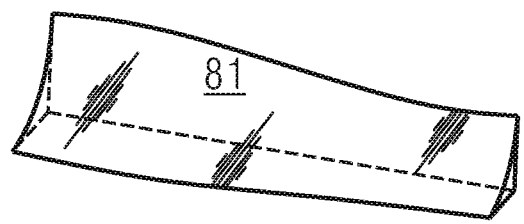

In a case shown in FIG. 10, two boundary segments of the sheet body 81 are coincident to the faces of the target body 91. Two other boundary segments of the sheet body 81 are not on the target body 91, with one of them connecting boundary edges of the target (sheet) body and the other one connecting a boundary edge and an internal point of the target body. In an exemplary embodiment, different patching could be realized, for example:

the middle part of the target body 91 ending at the projection of the non-coincident boundary segments to the target body 91 replaced by the sheet body 81, as illustrated in FIG. 10A;

the middle part of the target body 91 through the tangential extension of the non-coincident boundary segments on the target body 91 replaced by the sheet body 81, as illustrated in FIG. 10B;

the middle part of the target body 91 ending at the tangential extension of the coincident boundary segments on the target body 91 replaced by sheet body 81, as illustrated in FIG. 10C, or the top and the bottom part of the target body 91 replaced by the sheet body 81, as illustrated in FIG. 10D.

Figure 11:
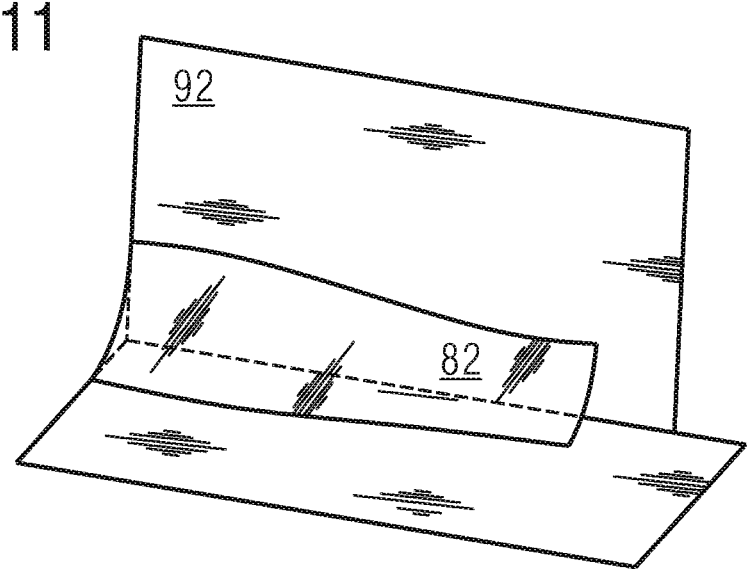
FIG. 11 illustrates an example of patching a sheet body to a target body in accordance with disclosed embodiments.
Figure 11A:
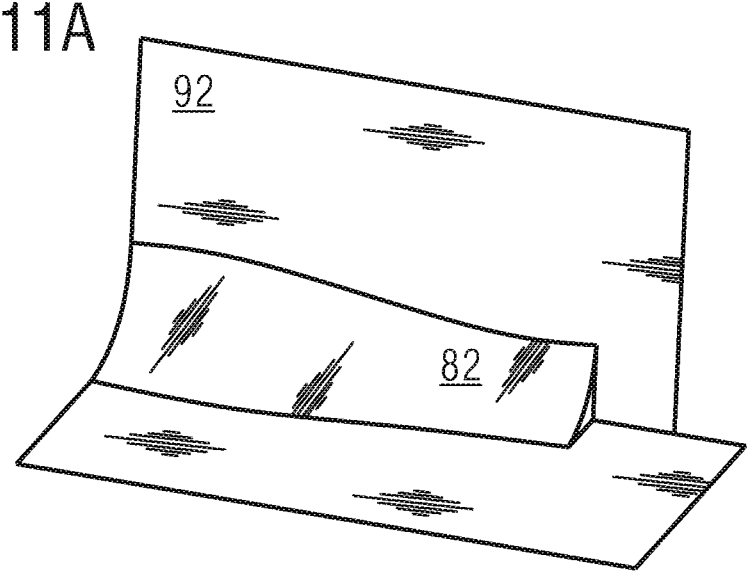
FIGS. 11A-11D illustrate the different patching result in accordance with disclosed embodiments.
Figure 11B:
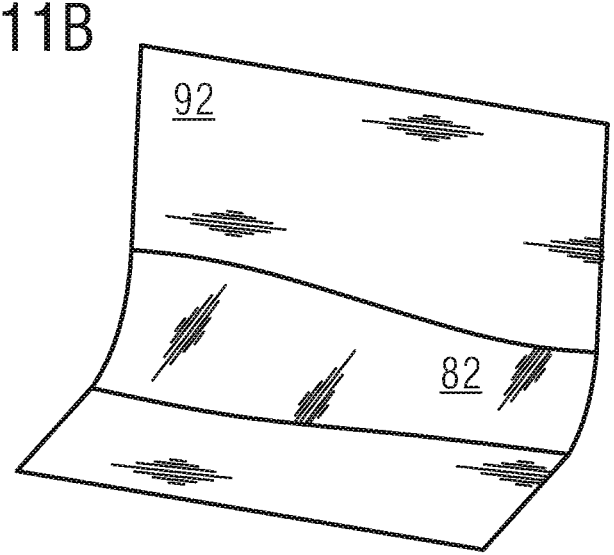
Figure 11C:
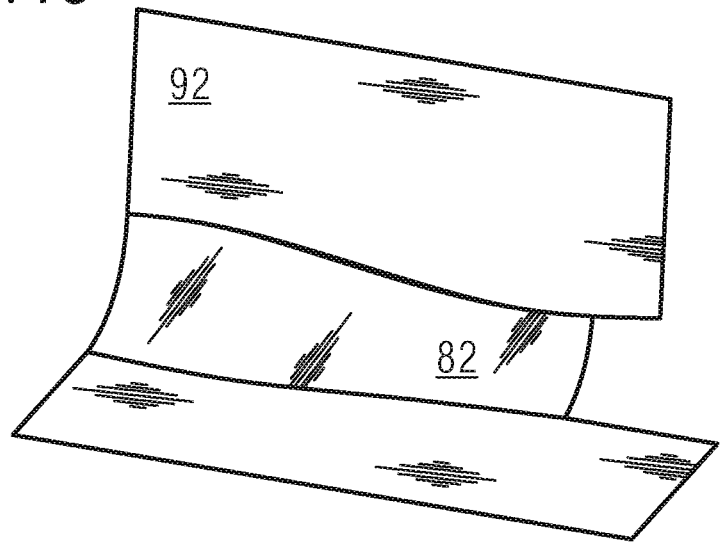
Figure 11D:
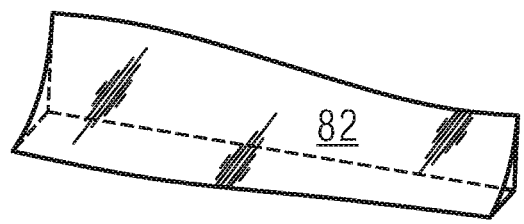

In a case shown in FIG. 11, two boundary segments of the sheet body 82 are coincident to the faces of the target body 92. Two other boundary segments of the sheet body 82 are not on the target body 92, with one of them connecting boundary edges of the target (sheet) body and the other one connecting two internal points of the target body 92. In an exemplary embodiment, different patching could be realized, for example:

the middle part of the target body 92 ending at the projection of the non-coincident boundary segments to the target body 92 replaced by the sheet body 82, as illustrated in FIG. 11A;

the middle part of the target body 92 through the tangential extension of the non-coincident boundary segments on the target body 92 replaced by the sheet body 82, as illustrated in FIG. 11B;

the middle part of the target body 92 ending at the tangential extension of the coincident boundary segments on the target body 92 replaced by sheet body 82, as illustrated in FIG. 11C, or the top and the bottom part of the target body 92 replaced by the sheet body 82, as illustrated in FIG. 11D.

Figure 12:
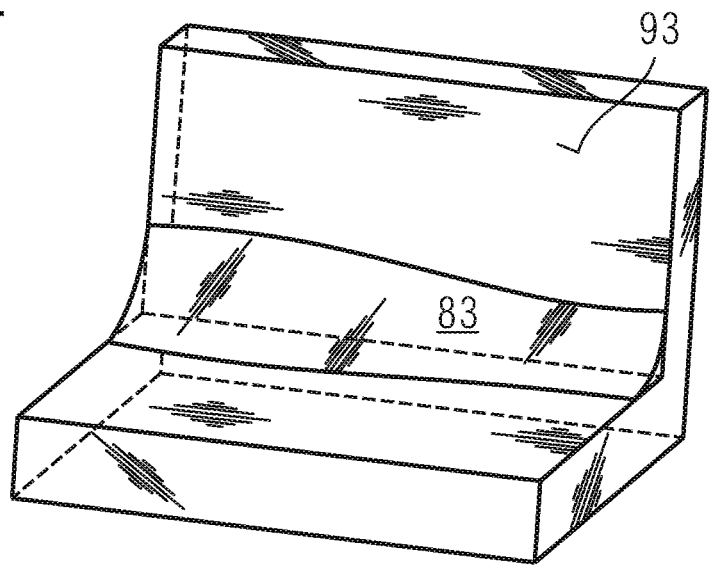
FIG. 12 illustrates an example of patching a sheet body to a target body in accordance with disclosed embodiments.
Figure 12A:
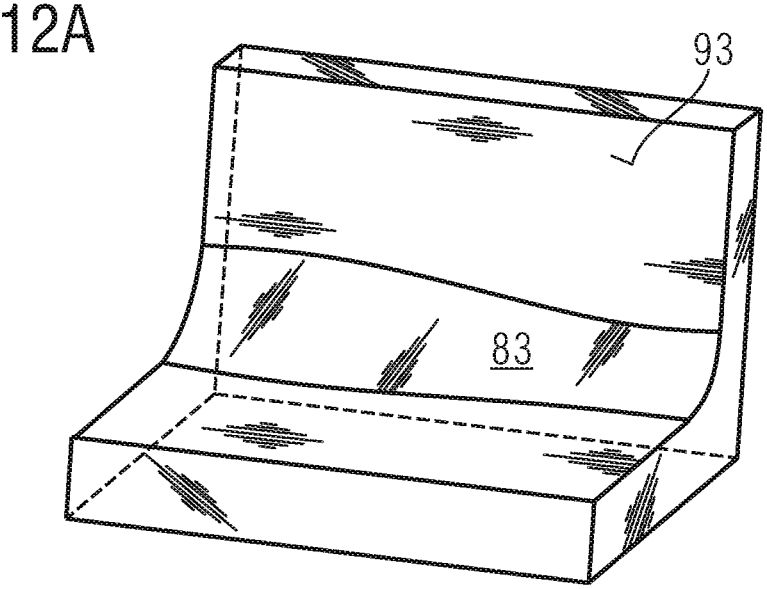
FIGS. 12A-12B illustrate the different patching result in accordance with disclosed embodiments.
Figure 12B:
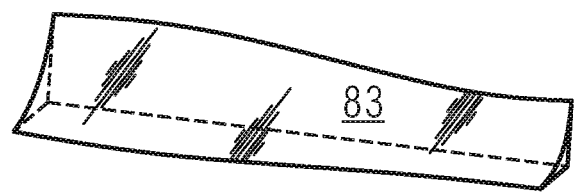

In a case shown in FIG. 12, two boundary segments of the sheet body 83 are coincident to the faces of the target body 93. Two other boundary segments of the sheet body 83 are not on the target body 93, with each of them connecting sharp edges of a smoothly connected set of side faces of the target body 93. In an exemplary embodiment, different patching could be realized, for example:

have the middle part of the target body 93 replaced by the sheet body 83 and the extension of the side faces of the target body 93, as illustrated in FIG. 12A; or have the top and the bottom part of the target body 93 replaced by the sheet body 83 and extension of the side faces, as illustrated in FIG. 12B.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

While the present disclosure has been described in detail with reference to certain embodiments, it should be appreciated that the present disclosure is not limited to those embodiments. In view of the present disclosure, many modifications and variations would be present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within their scope.

What is claimed is:

1. A method for patching a sheet body to a target body, wherein boundary edges of the sheet body are partially coincident with the target body, the method performed by a data processing system and comprising:

detecting all segments of the boundary edges that are coincident or non-coincident to the target body;

for a non-coincident segment with at least one end point which is in an interior of the target body but not on a sharp edge, determining a corresponding patch position on the target body, and projecting the non-coincident segment or a first extension on the target body;

for a non-coincident segment with both end points on sharp edges of the target body, filling an open region between the non-coincident segment and the sharp edges as an extension of faces of the sharp edges;

combining coincident segments and (1) the projected non-coincident segment or the first extension or (2) the non-coincident segment with the extension to divide the target body into separate regions; and replacing one of the regions by the sheet body.

2. The method of claim 1, wherein for the non-coincident segment with the at least one end point that is in the interior of the target body but not on the sharp edge, determining the corresponding patch position on the target body, and projecting the non-coincident segment or the first extension on the target body, including:

projecting a smooth extension of the non-coincident segment from the at least one end point which is in the interior of the target body but not on the sharp edge onto the target body until a boundary or a next sharp edge of the target body.

3. The method of claim 1, wherein for the non-coincident segment with the at least one end point that is in the interior of the target body but not on the sharp edge, determining the corresponding patch position on the target body, and projecting the non-coincident segment or the first extension on the target body, including:

projecting a smooth extension of an adjacent boundary segment from the end point which is in the interior of the target body but not on the sharp edge onto the target body until a boundary or a next sharp edge of the target body.

4. The method of claim 1, wherein for the non-coincident segment with the at least one end point that is in the interior of the target body but not on the sharp edge, determining the corresponding patch position on the target body, and projecting the non-coincident segment or the first extension on the target body, including:
for the non-coincident segment with only one of the at least one end point that is in the interior of the target body but not on the sharp edge, defining a point as a next sharp corner point on a target boundary from another end point of the non-coincident segment towards a face of the end point which is in the interior of the target body but not on the sharp edge;
projecting the non-coincident segment onto a target face set that contains the end point that is in the interior of the target body but not on the sharp edge, along a direction from the other end point to the next sharp corner point.

5. The method of claim 1, wherein for the non-coincident segment with the at least end point that is in the interior of the target body but not on the sharp edge, determining the corresponding patch position on the target body, and projecting the non-coincident segment or the first extension on the target body, including:
for the non-coincident segment with both end points in the interior of the target body but not on the sharp edge, projecting the segment onto a target face set that contains the two end points along a target face normal.

6. A data processing system comprising:
a processor; and
an accessible memory, the data processing system is configured by instructions in the accessible memory to patch a sheet body to a target body, wherein the sheet body is partially coincident with the target body, particularly, to:
detect all segments of a boundary of the sheet body that are coincident or non-coincident to the target body;
for a non-coincident segment with at least one end point which is in an interior of the target body but not on a sharp edge, determine a corresponding patch position on the target body, and project the non-coincident segment or a first extension on the target body;
for a non-coincident segment with both end points on sharp edges of the target body, fill an open region between the non-coincident segment and the sharp edges as an extension of faces of the sharp edges;
combine the coincident segments and (1) the projected non-coincident segment or the first extension or (2) the non-coincident segment with the extension to divide the target body into separate regions; and
replace one of the separate regions by the sheet body.

7. The data processing system of claim 6, wherein for the non-coincident segment with the at least one end point which is in the interior of the target body but not on the sharp edge, project a smooth extension of the non-coincident segment from the at least one end point which is in the interior of the target body but not on the sharp edge onto the target body until a boundary or a next sharp edge of the target body.

8. The data processing system of claim 6, wherein for the non-coincident segment with the at least one end point which is in the interior of the target body but not on the sharp edge, project a smooth extension of an adjacent boundary segment from the end point which is in the interior of the target body but not on the sharp edge onto the target body until a boundary or a next sharp edge of the target body.

9. The data processing system of claim 6, wherein for the non-coincident segment with only one of the at least one end point that is in the interior of the target body but not on the sharp edge, define a point as a next sharp corner point on a target boundary from another end point of the non-coincident segment towards a face of the end point which is in the interior of the target body but not on the sharp edge; and
project the non-coincident segment onto a target face set that contains the end point which is in the interior of the target body but not on the sharp edge, along a direction from the other end point to the next sharp corner point.

10. The data processing system of claim 6, wherein for the non-coincident segment with the both end points in the interior of the target body but not on the sharp edge, projecting the non-coincident segment onto a target face set that contains the both end points along a target face normal.

11. A non-transitory computer-readable medium encoded with executable instructions that, when executed, cause one or more data processing systems to patch a sheet body to a target body, wherein the sheet body is partially coincident with the target body, particularly, to:
detect all segments of a boundary of the sheet body that are coincident or non-coincident to the target body;
for a non-coincident segment with at least one end point which is in the interior of the target body but not on a sharp edge, determine a corresponding patch position on the target body, and project the non-coincident segment or a first extension on the target body;
for a non-coincident segment with both end points on sharp edges of the target body, fill an open region between the non-coincident segment and the sharp edges as an extension of faces of the sharp edges;
combine the coincident segments and (a) the projected non-coincident segment or the first extension or (b) the non-coincident segment with the extension to divide the target body into separate regions; and
replace one of the separate regions by the sheet body.

12. The computer-readable medium of claim 11, wherein for the non-coincident segment with the at least one end point which is in the interior of the target body but not on the sharp edge, project a smooth extension of the non-coincident segment from the end point which is in the interior of the target body but not on the sharp edge onto the target body until a boundary or a next sharp edge of the target body.

13. The computer-readable medium of claim 11, wherein for the non-coincident segment with the at least one end point which is in the interior of the target body but not on the sharp edge, project a smooth extension of an adjacent boundary segment from the at least one end point which is in the interior of the target body but not on the sharp edge onto the target body until a boundary or a next sharp edge of the target body.

14. The computer-readable medium of claim 11, wherein for the non-coincident segment with only one of the at least one end point which is in the interior of the target body but not on the sharp edge, define a point as a next sharp corner point on a target boundary from another end point of the non-coincident segment towards a face of the one end point which is in the interior of the target body but not on the sharp edge; and
project the non-coincident segment onto a target face set that contains the one end point which is in the interior of the target body but not on the sharp edge, along a direction from the other end point to the next sharp corner point.

15. The computer-readable medium of claim 11, wherein for the non-coincident segment with both end points in the interior of the target body but not on the sharp edge, projecting the non-coincident segment onto a target face set that contains the both end points along a target face normal.

* * * * *